US009672722B2

(12) United States Patent
Everett et al.

(10) Patent No.: US 9,672,722 B2
(45) Date of Patent: Jun. 6, 2017

(54) ALARM SYSTEM MONITOR SENSOR FOR MULTIMEDIA TERMINAL ADAPTER

(71) Applicant: ARRIS Enterprises, Inc., Suwanee, GA (US)

(72) Inventors: Kenneth Wayne Everett, Hoschton, GA (US); Richard A. Padula, Duluth, GA (US)

(73) Assignee: ARRIS Enterprise LLC, Suwanee, GA (US)

( * ) Notice: Subject to any disclaimer, the term of this patent is extended or adjusted under 35 U.S.C. 154(b) by 82 days.

(21) Appl. No.: 14/711,175

(22) Filed: May 13, 2015

(65) Prior Publication Data

US 2016/0335873 A1 Nov. 17, 2016

(51) Int. Cl.
*G08B 21/18* (2006.01)

(52) U.S. Cl.
CPC ............................. *G08B 21/182* (2013.01)

(58) Field of Classification Search
CPC .... G08B 21/00; G08B 21/182; G08B 21/185; G08B 21/187; H04M 1/24; H04M 1/82; H04W 24/08; H04W 76/06
USPC ..... 340/533, 568.4, 635, 657, 687; 370/352, 370/395.2; 379/32.01, 88.11, 88.12; 725/106, 129
See application file for complete search history.

(56) References Cited

U.S. PATENT DOCUMENTS

| | | | | | |
|---|---|---|---|---|---|
| 8,265,931 | B2* | 9/2012 | Caldwell | ............. | H04M 1/2475 |
| | | | | | 379/88.01 |
| 2003/0056226 | A1* | 3/2003 | Lazarus | ............. | H04N 7/17309 |
| | | | | | 725/129 |
| 2007/0064881 | A1* | 3/2007 | McGregor | .......... | H04M 3/2272 |
| | | | | | 379/32.01 |
| 2007/0133516 | A1* | 6/2007 | Stein | ................. | H04L 29/06027 |
| | | | | | 370/352 |

* cited by examiner

*Primary Examiner* — Hung T Nguyen
(74) *Attorney, Agent, or Firm* — Bart A. Perkins

(57) ABSTRACT

The methods, systems, and apparatuses described in this disclosure enable the identification of an alarm condition and the termination of a connection between an MTA and one or more telephony devices. An alarm condition can be identified at an MTA through the monitoring of feedback received from an alarm interface, and the MTA can respond to the identification of the alarm condition by terminating a connection to a telephony device for which communications are not routed through a corresponding alarm interface. An interface between the MTA and alarm interface may route communications to and from a telephony network through a first pair of wires and may receive feedback from the alarm interface through a second pair of wires.

20 Claims, 4 Drawing Sheets

ALARM SYSTEM MONITOR SENSOR FOR MULTIMEDIA TERMINAL ADAPTER

TECHNICAL FIELD

This disclosure relates to monitoring an alarm system at a multimedia terminal adapter.

BACKGROUND

Voice services may be supported at a customer premise by a multimedia terminal adapter (MTA). A MTA may be provided to a subscriber within an embedded MTA (EMTA). An EMTA provides subscribers with the combined functionality of a cable modem and a phone adapter, thus supporting both data and voice services at a customer premise.

Generally, an alarm system at a subscriber premise is connected to the premise's telephony wiring. Telephony wiring may be routed through an alarm interface (e.g., registered jack (RJ) interface such as an RJ31x jack) such that the alarm interface may seize the premise's telephony system to make an outgoing call when the alarm system is triggered. Typically, an alarm interface is installed between an EMTA and one or more telephony interfaces (e.g., twisted pair termination). When an alarm is triggered, the alarm interface drops voice service to the one or more telephony interfaces existing beyond the alarm interface. However, the EMTA may not be able to determine when an alarm event has occurred, and connections between the EMTA and other telephony devices may not be dropped.

Cable services are typically located in a home office or central location within a home. An MTA may then route communications from the network to the telephony network of the home. In order to be able to take control of and terminate connections of telephony devices to the network, the alarm interface is generally installed between the MTA and telephony devices. However, the MTA may provide a direct connection to telephony devices. When an alarm condition occurs, an MTA is typically unable to recognize the alarm condition, and telephony devices connected directly to the MTA will stay connected, thus preventing the alarm interface from seizing control of the phone network. Therefore, a need exists for improving methods and systems for recognizing an alarm event and terminating a connection between an MTA and telephony device when the alarm event is recognized.

BRIEF DESCRIPTION OF THE DRAWINGS

Like reference numbers and designations in the various drawings indicate like elements.

DETAILED DESCRIPTION

Figure 1:
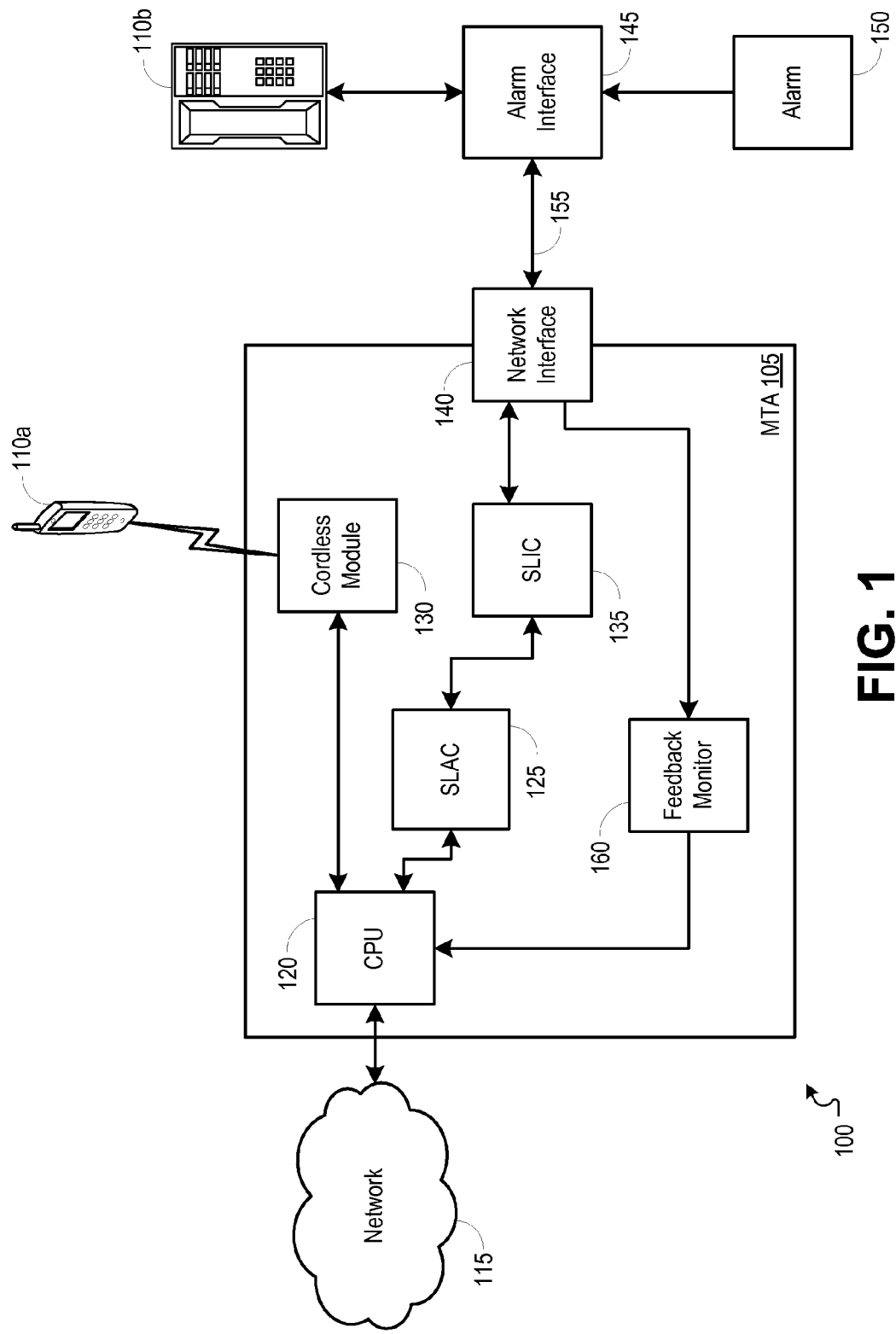
FIG. 1 is a block diagram illustrating an example network environment operable to facilitate the termination of a telephony connection at a multimedia terminal adapter upon the triggering of an alarm.

It is desirable to improve upon methods and systems for recognizing an alarm event and terminating a connection between an MTA and telephony device when the alarm event is recognized. The methods, systems, and apparatuses described herein enable the identification of an alarm condition and the termination of a connection between an MTA and one or more telephony devices. An alarm condition can be identified at an MTA through the monitoring of feedback received from an alarm interface, and the MTA can respond to the identification of the alarm condition by terminating a connection to a telephony device for which communications are not routed through a corresponding alarm interface. An interface between the MTA and alarm interface may route communications to and from a telephony network through a first pair of wires and may receive feedback from the alarm interface through a second pair of wires.

An embodiment of the invention described herein may include an apparatus comprising: (a) a first interface configured to be used to output communications to an alarm interface along a first wire pair and to receive feedback from the alarm interface along a second wire pair; (b) a second interface configured to be used to output communications to and receive communications from a telephony device; (c) a sensor configured to: (i) monitor voltage carried by the second wire pair; and (ii) determine that voltage has dropped below a threshold level at the second wire pair; and (d) a module configured to terminate a connection to the telephony device through the second interface when the determination is made that voltage has dropped below a threshold level at the second wire pair.

According to an embodiment of the invention, the first interface comprises: (a) a first pair of pins configured to be used to output communications to and receive communications from the alarm interface; and (b) a second pair of pins configured to be used to receive feedback from the alarm interface.

According to an embodiment of the invention, the first interface comprises a registered jack interface.

According to an embodiment of the invention, the second interface may be configured to output communications to and receive communications from a cordless telephone.

According to an embodiment of the invention, a module may be configured to: (a) monitor subscriber line interface voltage; and (b) determine that voltage is absent from the subscriber line interface.

According to an embodiment of the invention, the module may be further configured to terminate a connection with an upstream component.

An embodiment of the invention described herein may include a method comprising: (a) receiving feedback from an alarm interface at a multimedia terminal adapter; (b) determining, at the multimedia terminal adapter, that an alarm connected to the alarm interface is triggered, wherein the determination is based upon feedback received from the alarm interface; and (c) terminating a connection between the multimedia terminal adapter and a telephony device, wherein the telephony device interfaces with the multimedia terminal adapter.

According to an embodiment of the invention, determining that an alarm connected to the alarm interface is triggered comprises: (a) wherein a first wire pair routes communications between the multimedia terminal adapter and the alarm interface and a second wire pair carries feedback from the alarm interface to the multimedia terminal adapter; (b) monitoring, at the multimedia terminal adapter, voltage carried by the second wire pair; and (c) determining that voltage has dropped below a threshold level at the second wire pair.

According to an embodiment of the invention, the second wire pair and the first wire pair may be connected to the multimedia terminal adapter at the same interface, and the connection between the multimedia terminal adapter and alarm interface through the first wire pair may be maintained after it is determined that voltage has dropped below a threshold level at the second wire pair.

According to an embodiment of the invention, determining that an alarm connected to the alarm interface is triggered comprises: (a) monitoring voltage at a subscriber line interface associated with the multimedia terminal adapter; and (b) determining that voltage is absent from the subscriber line interface.

According to an embodiment of the invention, the alarm interface may be integrated into the multimedia terminal adapter.

An embodiment of the invention described herein may include one or more non-transitory computer readable media having instructions operable to cause one or more processors to perform the operations comprising: (a) receiving feedback from an alarm interface at a multimedia terminal adapter; (b) determining, at the multimedia terminal adapter, that an alarm connected to the alarm interface is triggered; (c) terminating a connection between the multimedia terminal adapter and a telephony device, wherein the telephony device interfaces with the multimedia terminal adapter.

FIG. 1 is a block diagram illustrating an example network environment 100 operable to facilitate the termination of a telephony connection at a multimedia terminal adapter upon the triggering of an alarm. In embodiments, a multimedia terminal adapter (MTA) 105 may facilitate delivery of voice services to one or more telephony devices 110a-b within a subscriber premise. Telephony devices 110a-b may include cordless telephone(s) 110a and/or corded telephone(s) 110b. It should be understood that the MTA 105 may be integrated with other customer premise equipment (CPE) devices (e.g., an embedded MTA (EMTA) comprising a MTA and a cable modem).

In embodiments, an MTA 105 may receive communications from and output communications onto a network 115 (e.g., hybrid fiber-coaxial (HFC) network, twisted pair network, passive optical network (PON), or any other telecommunications access network). The MTA 105 may be controlled by a central processing unit (CPU) 120. The CPU 120 may control various functions of the MTA 105 including routing of communications received at the MTA 105, monitoring the health/status of communications and/or components of the MTA 105, and various other functions. For example, the CPU 120 can establish and maintain a connection (e.g., a call) between a corded telephone 110b (or telephony network within a premise) and an upstream network component (e.g., server, switch, third party such as a calling party or called party, etc.) via a subscriber line access controller (SLAC) 125, and can establish and maintain a connection between a cordless telephone 110a and an upstream network component via a cordless module 130.

Communications may be managed and routed between one or more telephony devices (or telephony network) and an upstream network component by a CPU 120. For example, the CPU 120 can pass communications to and from a cordless telephone 110a through a cordless module 130.

The CPU 120 can pass communications to and from a corded telephone 110b through a SLAC 125. A SLAC 125 can route communications to and from a cordless telephone 110a through a cordless module 130 (e.g., digital enhanced cordless telecommunications (DECT) interface). The SLAC 125 may include a digital signal processor (DSP) configured to perform various operations such as compression algorithms, analog-to-digital conversions, digital-to-analog conversion, and others. In embodiments, the CPU 120 may comprise a DSP for operating on communications output to and received from the cordless module 130. The SLAC 125 may route communications to and from a corded telephone 110b through a subscriber line interface card (SLIC) 135 and network interface 140. The SLIC 135 may interface with signals transmitted to and received from tip and ring contacts of the network interface 140. It should be understood that the various components described within the MTA 105 may be integrated into one or more components or integrated circuits (e.g., system on chip (SoC)).

In embodiments, communications to and from a corded telephone 110b may be routed through an alarm interface 145. The alarm interface 145 may include a registered jack interface (e.g., RJ31) or any other interface configured to route telephony communications and interface with an alarm system. Telephony communications between the MTA 105 and corded telephone 110b can be routed through the alarm interface 145, and the alarm interface 145 may be connected to an alarm 150. When the alarm 150 is triggered, the alarm 150 can signal the alarm interface 145 to terminate the connection between the corded telephone 110b and the MTA 105.

In embodiments, the connection 155 between the alarm interface 145 and MTA 105 may include one or more twisted pairs. For example, a four-conductor cable (or six-conductor, eight-conductor, etc.) can connect the MTA 105 to the alarm interface 145. A first pair of wires within the four-conductor cable may transport communications to and from the corded telephone 110b, and a second pair of wires within the four-conductor cable may transport feedback from the alarm interface 145 to the MTA 105. It will be appreciated by those skilled in the relevant art that the connection 155 may include various types of cables and may comprise registered jack connectors (e.g., RJ11, RJ14, etc.) or any other connector configured to facilitate the transport of telephony signals.

In embodiments, a feedback monitor 155 may be connected to a wire pair transporting feedback from the alarm interface 145 to the MTA 105. The feedback monitor 160 may include a voltage sensing circuit configured to monitor voltage in the wire pair carrying feedback from the alarm interface 145. It will be appreciated by those skilled in the relevant art that various voltage sensing circuits may be used to monitor voltage in the wire pair. When the feedback monitor 160 determines that voltage is absent from the wire pair, the feedback monitor 160 can output a signal to the CPU 120 informing the CPU 120 that the alarm 150 has been triggered.

When the CPU 120 is informed that the alarm 150 has been triggered, the CPU 120 can terminate connections between one or more telephony devices and an upstream component. The CPU 120 can cause a connection between a cordless telephone 110a and the MTA 105 to be terminated by outputting a message to the cordless module 130. The CPU 120 can cause a connection between a corded telephone 110b and the MTA 105 to be terminated by outputting a message to the SLAC 125. Further, the CPU 120 can disconnect the MTA 105 from a call at the network 115. For example, a line connecting the MTA 105 to an upstream component can be cleared when an alarm is triggered by outputting a message from the CPU 120 to an upstream component, the message requesting the termination of the call. Terminating the call at the network 115 may include causing a third party device (e.g., calling party or called party) to terminate the connection with the MTA 105.

While the components shown in FIG. 1 are shown separate from each other, it should be understood that the various components can be integrated into each other. For example, the alarm interface 140 may be integrated into the MTA 105.

Figure 2:
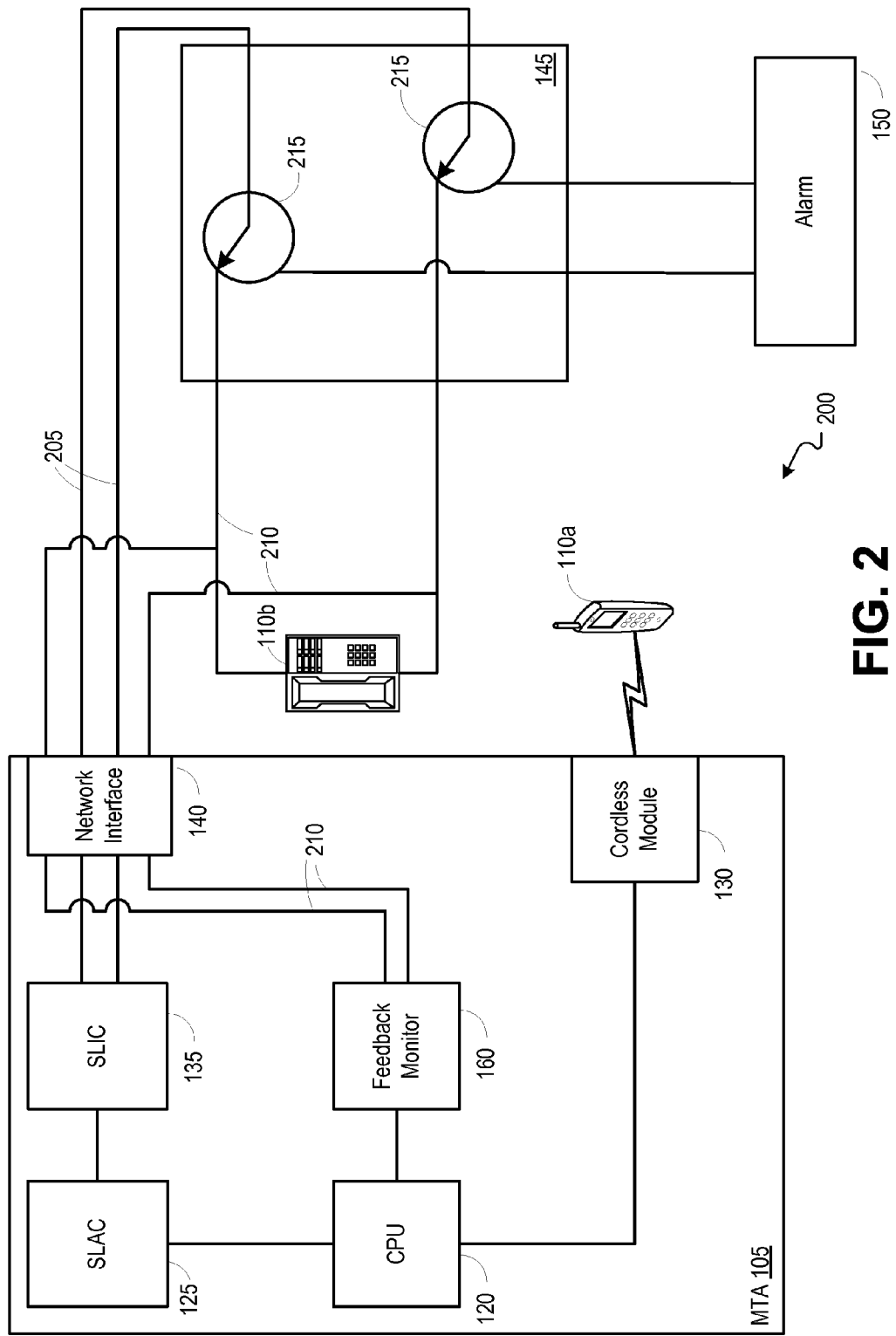
FIG. 2 is a block diagram illustrating an example system operable to facilitate the termination of a telephony connection at a multimedia terminal adapter upon the triggering of an alarm.

FIG. 2 is a block diagram illustrating an example system 200 operable to facilitate the termination of a telephony connection at a multimedia terminal adapter upon the triggering of an alarm. A CPU 120 may route communications to and from one or more telephony devices (e.g., cordless telephone 110*a*, corded telephone 110*b*, etc.) through a SLAC 125 and SLIC 135 or cordless module 130.

In embodiments, a network interface 140 may include a plurality of pin pairs. The network interface 140 may be a registered jack port (e.g., RJ11, RJ14, etc.). A first pair of pins (e.g., inner pin pair) at the network interface 140 may be used in the transport of communications to and from one or more telephony devices (e.g., corded telephone(s) 110*b*). The first pair of pins can output communications to and receive communications from a first pair of wires (e.g., inner wire pair 205) associated with the connection between the MTA 105 and alarm interface 145 (e.g., connection 155 of FIG. 1). A second pair of pins (e.g., outer pin pair) at the network interface 140 may be used in the transport of feedback communications from the alarm interface 145 to the feedback monitor 160. The second pair of pins can receive communications from a second pair of wires (e.g., outer wire pair 210) associated with the connection between the MTA 105 and alarm interface 145 (e.g., connection 155 of FIG. 1).

In embodiments, the first wire pair (e.g., inner wire pair 205) may carry communications from the MTA 105 to the alarm interface 145. Communications carried along the first wire pair may be routed to an alarm 150 and/or to one or more telephony devices (e.g., corded telephone(s) 110*b*). The first wire pair may be connected to the input of the alarm interface 145.

In embodiments, the second wire pair (e.g., outer wire pair 210) may be connected to the output of the alarm interface 145 and may carry communications from the alarm interface 145 to one or more corded telephones 110*b* and to the MTA 105. At the MTA 105, a feedback monitor 160 may be connected to the second wire pair. The alarm interface 145 may include one or more switches 215. When the alarm 150 is triggered, the one or more switches 215 can be tripped, thus terminating the connection between the alarm interface 145 and the one or more corded telephones 110*b* and MTA 105 through the second wire pair. During an alarm condition, when the one or more switches 215 are tripped, no signals will be output from the alarm interface 145 along the second wire pair, thereby causing the connected, corded telephones 110*b* to drop a current call and the voltage carried by the second wire pair to drop or cease. In embodiments, when the alarm condition has ended, the alarm 150 may cause the switches to reset, thus re-establishing a connection between the alarm interface 145 and the corded telephone(s) 110*b* and MTA 105 through the second wire pair.

In embodiments, the feedback monitor 160 monitors the voltage carried by the second wire pair (e.g., outer wire pair 210) at the MTA 105. It should be understood that the feedback monitor 160 may include one of many different voltage sensing circuits. When the one or more switches 215 at the alarm interface 145 are tripped, the tripped switches can create a connection between the MTA 105 and the alarm 150 and severe the connection between the alarm interface 145 output and the MTA 105 and corded telephone(s) 110*b*. When the switches 215 at the alarm interface 145 are tripped, the feedback monitor 160 may determine that voltage is absent from or has otherwise dropped at the second wire pair, and the feedback monitor 160 can output a signal to the CPU 120 informing the CPU 120 that the alarm 150 has been triggered. The feedback monitor can alert the CPU 120 when the voltage measured at the second wire pair drops below a threshold level. The threshold voltage level may be a voltage indicating an active connection or call. When the CPU 120 is informed that the alarm 150 has been triggered, the CPU 120 can terminate a connection between a corded telephone 110*b* and the MTA 105 through the SLAC 125 and can terminate a connection between a cordless telephone 110*a* and the MTA 105 through the cordless module 130 (e.g., DECT interface). When the CPU 120 is informed that the alarm 150 has been triggered, the CPU 120 may also output a message to an upstream network component causing the connection or call to be terminated on the network side (e.g., network 115 of FIG. 1).

Figure 3:
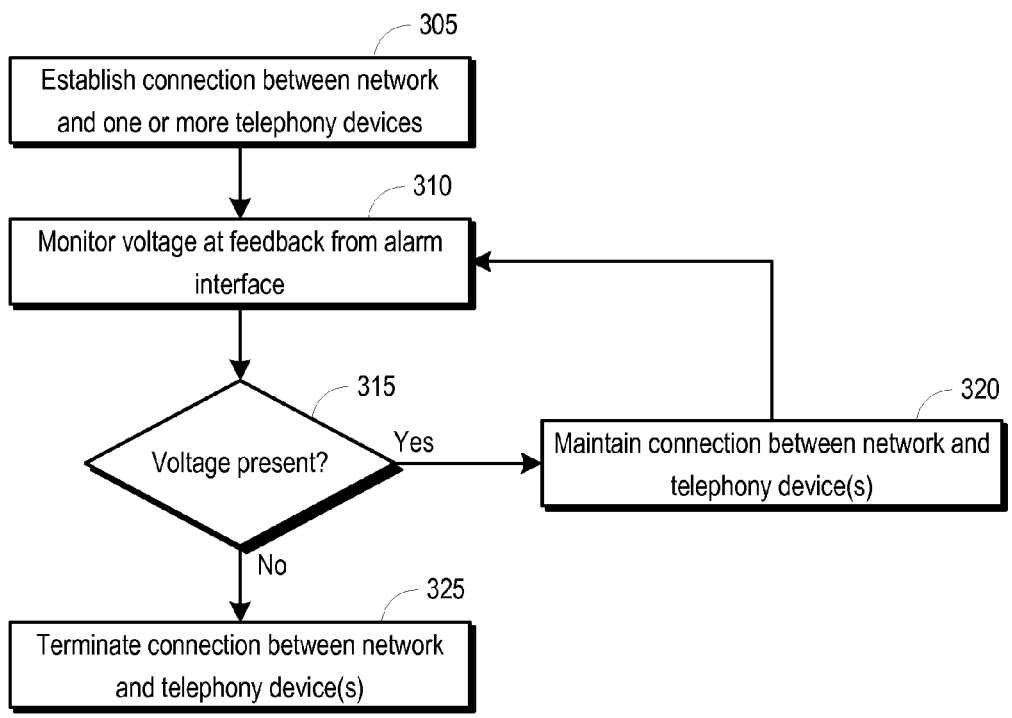
FIG. 3 is a flowchart illustrating an example process operable to facilitate the termination of a telephony connection at a multimedia terminal adapter upon the triggering of an alarm.

FIG. 3 is a flowchart illustrating an example process 300 operable to facilitate the termination of a telephony connection at a multimedia terminal adapter upon the triggering of an alarm. The process 300 can begin at 305, when a connection is established between a network or upstream network component and one or more telephony devices (e.g., cordless telephone 110*a* of FIG. 1, corded telephone 110*b* of FIG. 1, etc.). For example, a connection can be established between a network 115 of FIG. 1 and one or more telephony devices by an MTA 105 of FIG. 1. It should be understood that a connection may be established when a user makes an outgoing call or when a user answers an incoming call.

At 310, feedback from an alarm interface is monitored at an MTA. In embodiments, feedback from an alarm interface 145 of FIG. 1 may be output to an MTA 105 of FIG. 1 through a pair of wires (e.g., outer wire pair 210 of FIG. 2). A feedback monitor 160 of FIG. 1 may be connected to the pair of wires, and the feedback monitor 160 may monitor the voltage carried by the wire pair. It should be understood that the feedback monitor 160 may include one of various circuits configured to sense voltage carried by one or more wires.

At 315, a determination may be made whether voltage is present in one or more wires carrying feedback from the alarm interface. The determination whether voltage is present in one or more wires (e.g., outer wire pair 210 of FIG. 2) can be made, for example, by the feedback monitor 160 of FIG. 1. If the determination is made that voltage is present in the one or more wires, the connection between the network and one or more telephony devices can be maintained at 320. For example, the CPU 120 may continue to route communications between a network (e.g., network 115 of FIG. 1) and one or more telephony devices (e.g., cordless telephone 110*a*, corded telephone 110*b* of FIG. 1, etc.). While the connection between the network and telephony device(s) is maintained, feedback from the alarm interface can continue to be monitored at 310.

If, at 315, the determination is made that voltage is not present in the one or more wires, the process 300 can proceed to 325. At 325, the connection between the network and one or more telephony devices can be terminated. In embodiments, when the feedback monitor 160 of FIG. 1 determines that voltage is no longer present in the one or more wires (e.g., outer wire pair 210 of FIG. 2), the feedback monitor 160 can output a signal to the CPU 120, the signal directing the CPU 120 to terminate connections between one or more telephony devices and an associated MTA (e.g., MTA 105 of FIG. 1). For example, the CPU 120 can signal a SLAC 125 to terminate a connection with one or more corded telephones 110*b* of FIG. 1 and the CPU 120 can signal a cordless module 130 of FIG. 1 to terminate a connection with one or more cordless telephones 110*a* of FIG. 1. The CPU 120 can also cause a connection to be terminated at the network side (e.g., network 115 of FIG. 1) by outputting a message to an upstream network component. Terminating the connection at the network side may allow an alarm system (e.g., alarm 150 of FIG. 1) to place an outgoing call to a monitoring service.

Figure 4:
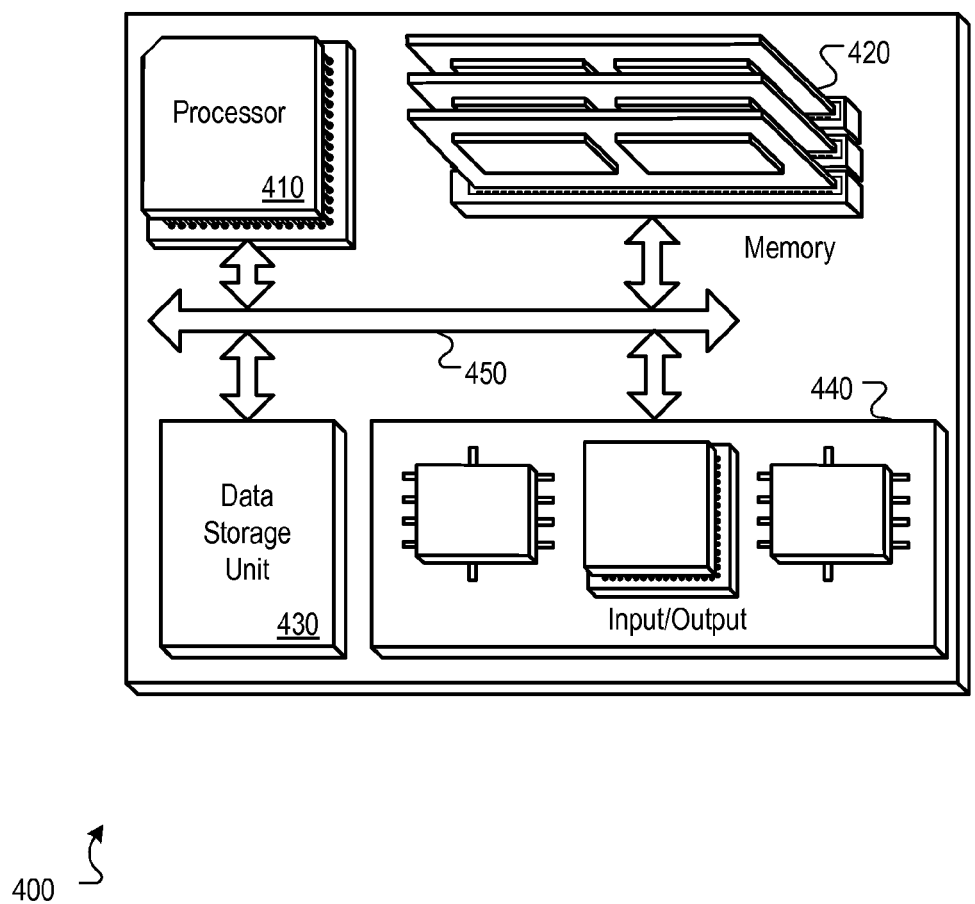
FIG. 4 is a block diagram of a hardware configuration operable to facilitate the termination of a telephony connection at a multimedia terminal adapter upon the triggering of an alarm.

FIG. 4 is a block diagram of a hardware configuration 400 operable to facilitate the termination of a telephony connection at a multimedia terminal adapter upon the triggering of an alarm. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, data, and/or voice services to a client device (e.g, cordless telephone 110*a* of FIG. 1, corded telephone 110*b* of FIG. 1, etc.). In embodiments, the input/output device can include driver devices configured to send communications to, and receive communications from one or more networks (e.g., network 115 of FIG. 1).

Those skilled in the art will appreciate that the invention improves upon methods and systems for terminating a telephony connection at a multimedia terminal adapter upon the triggering of an alarm. The methods, systems, and apparatuses described in this disclosure enable the identification of an alarm condition at a MTA and the termination of a connection between the MTA and one or more telephony devices. An alarm condition can be identified at a MTA through the monitoring of feedback received from an alarm interface, and the MTA can respond to the identification of the alarm condition by terminating a connection to a telephony device for which communications are not routed through a corresponding alarm interface.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. An apparatus comprising:
   a first interface configured to be used to output communications to an alarm interface along a first wire pair and to receive feedback from the alarm interface along a second wire pair;
   a second interface configured to be used to output communications to and receive communications from a telephony device;
   a sensor configured to:
   monitor voltage carried by the second wire pair; and
   determine that voltage has dropped below a threshold level at the second wire pair;
   a module configured to terminate a connection to the telephony device through the second interface when the determination is made that voltage has dropped below a threshold level at the second wire pair.

2. The apparatus of claim 1, wherein the first interface comprises:
   a first pair of pins configured to be used to output communications to and receive communications from the alarm interface; and
   a second pair of pins configured to be used to receive feedback from the alarm interface.

3. The apparatus of claim 1, wherein the first interface comprises a registered jack interface.

4. The apparatus of claim 1, wherein the second interface is configured to output communications to and receive communications from a cordless telephone.

5. The apparatus of claim 1, further comprising a module configured to:
   monitor subscriber line interface voltage; and
   determine that voltage is absent from the subscriber line interface.

6. The apparatus of claim 1, wherein the module is further configured to terminate a connection with an upstream component.

7. A method executed by a processor comprising:
   receiving feedback from an alarm interface at a multimedia terminal adapter;
   determining, at the multimedia terminal adapter, that an alarm connected to the alarm interface is triggered, wherein the determination is based upon feedback received from the alarm interface; and
   terminating a connection between the multimedia terminal adapter and a telephony device, wherein the telephony device interfaces with the multimedia terminal adapter by the processor.

8. The method executed by the processor of claim 7, wherein determining that an alarm connected to the alarm interface is triggered comprises:
   wherein a first wire pair routes communications between the multimedia terminal adapter and the alarm interface and a second wire pair carries feedback from the alarm interface to the multimedia terminal adapter;
   monitoring, at the multimedia terminal adapter, voltage carried by the second wire pair; and
   determining that voltage has dropped below a threshold level at the second wire pair.

9. The method executed by the processor of claim 8, wherein the second wire pair and the first wire pair are connected to the multimedia terminal adapter at the same interface, and the connection between the multimedia terminal adapter and alarm interface through the first wire pair is maintained after it is determined that voltage has dropped below a threshold level at the second wire pair.

10. The method executed by the processor of claim 9, wherein the interface comprises a registered jack interface.

11. The method executed by the processor of claim 7, wherein determining that an alarm connected to the alarm interface is triggered comprises:
    monitoring voltage at a subscriber line interface associated with the multimedia terminal adapter; and
    determining that voltage is absent from the subscriber line interface.

12. The method executed by the processor of claim 7, wherein the alarm interface is integrated into the multimedia terminal adapter.

13. The method executed by the processor of claim 7, further comprising:
    terminating a connection between the multimedia terminal adapter and an upstream network component.

14. One or more non-transitory computer readable media having instructions operable to cause one or more processors to perform the operations comprising:
    receiving feedback from an alarm interface at a multimedia terminal adapter;
    determining, at the multimedia terminal adapter, that an alarm connected to the alarm interface is triggered;
    terminating a connection between the multimedia terminal adapter and a telephony device, wherein the telephony device interfaces with the multimedia terminal adapter.

15. The one or more non-transitory computer-readable media of claim 14, wherein determining that an alarm connected to the alarm interface is triggered comprises:
    wherein a first wire pair routes communications between the multimedia terminal adapter and the alarm interface and a second wire pair carries feedback from the alarm interface to the multimedia terminal adapter;

monitoring, at the multimedia terminal adapter, voltage carried by the second wire pair; and determining that voltage has dropped below a threshold level at the second wire pair.

16. The one or more non-transitory computer-readable media of claim 15, wherein the second wire pair and the first wire pair are connected to the multimedia terminal adapter at the same interface, and the connection between the multimedia terminal adapter and alarm interface through the first wire pair is maintained after it is determined that voltage has dropped below a threshold level at the second wire pair.

17. The one or more non-transitory computer-readable media of claim 16, wherein the interface comprises a registered jack interface.

18. The one or more non-transitory computer-readable media of claim 14, wherein determining that an alarm connected to the alarm interface is triggered comprises:

monitoring voltage at a subscriber line interface associated with the multimedia terminal adapter; and determining that voltage is absent from the subscriber line interface.

19. The one or more non-transitory computer-readable media of claim 14, wherein the alarm interface is integrated into the multimedia terminal adapter.

20. The one or more non-transitory computer-readable media of claim 14, wherein the instructions are further operable to cause one or more processors to perform the operations comprising:

terminating a connection between the multimedia terminal adapter and an upstream network component.

* * * * *